US011296562B2

(12) United States Patent
Wu et al.

(10) Patent No.: US 11,296,562 B2
(45) Date of Patent: Apr. 5, 2022

(54) STATOR ELEMENT, STATOR ASSEMBLY, MOTOR, AND ELECTROMECHANICAL DEVICE

(71) Applicant: NIDEC CORPORATION, Kyoto (JP)

(72) Inventors: Keng-Chang Wu, Tainan (TW); Guo-Jhih Yan, Tainan (TW)

(73) Assignee: NIDEC CORPORATION, Kyoto (JP)

( * ) Notice: Subject to any disclaimer, the term of this patent is extended or adjusted under 35 U.S.C. 154(b) by 231 days.

(21) Appl. No.: 16/703,868

(22) Filed: Dec. 5, 2019

(65) Prior Publication Data

US 2020/0185984 A1 Jun. 11, 2020

(30) Foreign Application Priority Data

Dec. 10, 2018 (CN) ......................... 201822063051.5

(51) Int. Cl.
*H02K 1/20* (2006.01)
*H02K 16/02* (2006.01)
*H02K 1/18* (2006.01)

(52) U.S. Cl.
CPC ............... *H02K 1/20* (2013.01); *H02K 1/182* (2013.01); *H02K 16/02* (2013.01)

(58) Field of Classification Search
CPC .......... H02K 1/20; H02K 16/02; H02K 1/182; H02K 9/22; H02K 5/18; H02K 21/24
See application file for complete search history.

(56) References Cited

U.S. PATENT DOCUMENTS 9,154,020 B2 10/2015 Deguchi et al.
9,496,776 B2 11/2016 Woolmer et al.
2006/0208606 A1* 9/2006 Hirzel ...................... H02K 1/02 310/268
2008/0100159 A1* 5/2008 Dawsey .................. B60L 1/003 310/54
2015/0280525 A1* 10/2015 Rippel ..................... H02K 9/24 310/54
2018/0198351 A1* 7/2018 Akutsu .................. H02K 7/003

FOREIGN PATENT DOCUMENTS

JP 2012-182862 9/2012

* cited by examiner

*Primary Examiner* — Thomas Truong
(74) *Attorney, Agent, or Firm* — JCIPRNET

(57) ABSTRACT

Embodiments of this application provide a stator element, a stator assembly, a motor, and an electromechanical device, the stator element including at least two stacked stator housing sheets, each of the stator housing sheets being a frame enclosed by a sheet periphery, at least two protrusions being disposed around the periphery of each of the stator housing sheets, the protrusion being directed from an inside of the stator housing sheet to an outside of the stator housing sheet, a groove being formed between adjacent protrusions, and protrusions of the adjacent stator housing sheets being alternately arranged in a direction in which the at least two stator housing sheets are stacked. Therefore, heat of a stator disposed inside the stator element can be dissipated with a strong heat dissipation capability at relatively low costs.

16 Claims, 4 Drawing Sheets

28
30
27
211
214
22
215
21
215
214

STATOR ELEMENT, STATOR ASSEMBLY, MOTOR, AND ELECTROMECHANICAL DEVICE

CROSS REFERENCE TO RELATED APPLICATIONS

This application claims the priority benefit of Chinese Patent Application No. 201822063051.5, filed on Dec. 10, 2018. The entirety of the above-mentioned patent application is hereby incorporated by reference herein and made a part of this specification.

1. FIELD OF THE INVENTION

This application relates to the electromechanical field, and in particular, to a stator element, a stator assembly, a motor, and an electromechanical device.

2. BACKGROUND

A motor includes a stator and a rotor that can rotate relative to the stator. The rotor generally includes a magnet, and the stator generally includes a stator coil. The stator coil generates a magnetic field after being energized. The magnetic field interacts with the magnet of the rotor to drive the rotor to rotate.

During operation of the motor, the stator coil generates heat after being energized. In a prior-art solution, heat of the stator coil is dissipated by disposing some structures. For example, a conductive structure is disposed in the motor. The conductive structure contacts with the stator coil to dissipate heat of the stator coil; or the stator coil is encapsulated in resin, and the heat of the stator coil is dissipated through the resin; or a water-cooled passage is disposed in a housing of the motor, and the heat of the stator coil is dissipated through flowing water in the water-cooled passage.

It should be noted that, the above description of the technical background is only for the purpose of facilitating a clear and complete description of the technical solutions of the patent and facilitating the understanding by those skilled in the art. The above technical solutions are not considered to be well known to those skilled in the art simply because these solutions are described in the background section of the patent.

SUMMARY

The inventor of this application finds some problems in an existing structure for dissipating heat of a stator coil. For example, in a solution in which a conductive structure is disposed in a motor, the conductive structure may affect a power or efficiency of a magnetic circuit between a stator and a rotor of the motor. In a solution of encapsulating the stator coil in resin, since a heat conduction effect of the resin is limited, a heat dissipation effect is limited. In a solution of disposing a water-cooled passage in a housing of the motor, costs of the water-cooled passage are relatively high, and the motor is difficult to miniaturize.

In order to resolve at least one of the problems, this application provides a stator element, a stator assembly, a motor, and an electromechanical device. The stator element includes at least two stator housing sheets, and protrusions of the adjacent stator housing sheets are alternately arranged in a direction in which the at least two stator housing sheets are stacked, to increase a contact area between the projections and air outside the stator element, thereby dissipating heat of the stator disposed inside the stator element with a relatively strong heat dissipation capability at relatively low costs.

According to an aspect of embodiments of this application, a stator element is provided, including at least two stator housing sheets that are arranged in a stack manner, each of the stator housing sheets being a frame enclosed by a periphery formed in a sheet shape, at least two protrusions being disposed around the periphery of each of the stator housing sheets, the protrusion being directed from an inside of the stator housing sheet to an outside of the stator housing sheet, a groove being formed between the adjacent protrusions, and the protrusions of the adjacent stator housing sheets being alternately arranged in a stack direction of the at least two stator housing sheets.

According to another aspect of embodiments of this application, at least one internal screw stud mounting groove and at least one bolt hole are further disposed on the periphery of each of the stator housing sheets, where a shape of an inner periphery of the internal screw stud mounting groove is the same as that of an outer periphery of the internal screw stud.

According to another aspect of embodiments of this application, a diameter of the bolt hole is less than a diameter of a circumcircle of the internal screw stud mounting groove and greater than an inner diameter of the internal screw stud.

According to another aspect of embodiments of this application, in the stack direction of the at least two stator housing sheets and within a height range of the internal screw stud, the internal screw stud mounting grooves of the adjacent stator housing sheets are aligned.

According to another aspect of embodiments of this application, the bolt holes of the stator housing sheets on an upper side and a lower side in the height range of the internal screw stud are aligned with the internal screw stud mounting groove of the stator housing sheet within the height range of the internal screw stud.

According to another aspect of embodiments of this application, in the two adjacent stator housing sheets, shapes of the stator housing sheets are the same, and the shape of the stator housing sheet and mirror shapes thereof do not overlap, and in the two adjacent stator housing sheets, one of the stator housing sheets is turned by 180 degrees relative to the other of the stator housing sheets.

According to another aspect of embodiments of this application, one or more resin engaging trenches are disposed on an inner edge of the periphery of each of the stator housing sheets, and in the stack direction of the at least two stator housing sheets, the resin engaging trenches of the adjacent stator housing sheets are alternately arranged.

According to another aspect of embodiments of this application, the stator housing sheet is formed through impact molding, laser cutting, or wire cutting.

According to another aspect of embodiments of this application, a stator assembly is provided, including a stator and the stator element according to any of foregoing aspects, the stator being located inside the stator element.

According to another aspect of embodiments of this application, the stator assembly includes a coil, and further includes resin that is used to fix the coil to an interior of the stator element.

According to another aspect of embodiments of this application, a motor is provided, including a rotor that rotates around a central axis and the stator assembly according to the foregoing embodiments.

According to another aspect of embodiments of this application, the rotor and the stator assembly are oppositely disposed in a direction parallel to the central axis.

According to another aspect of embodiments of this application, the motor further includes a first cover and a second cover, and in a direction parallel to the central axis, the first cover and the second cover respectively clamp the stator element from both axial sides of the stator element.

According to another aspect of embodiments of this application, an electromechanical device is provided, including the motor according to the foregoing embodiments.

Specific implementations of the patent are disclosed in detail with reference to the following description and the accompanying drawings, which illustrate the manner in which the principles of the patent can be adopted. It should be understood that the implementations of the patent are not limited in scope. The implementations of the patent include many variations, modifications, and equivalents within the spirit and scope of the appended claims.

BRIEF DESCRIPTION OF THE DRAWINGS

The included accompanying drawings are used to provide further understanding of the embodiments of the patent, constitute a part of the specification, and are used to illustrate implementations of the and explain the principle of the patent together with literal descriptions. Obviously, the accompanying drawings in the following descriptions are merely some embodiments of the patent, and a person of ordinary skill in the art may further obtain other accompanying drawings according to the accompanying drawings without creative efforts.

DETAILED DESCRIPTION

Figure 1:
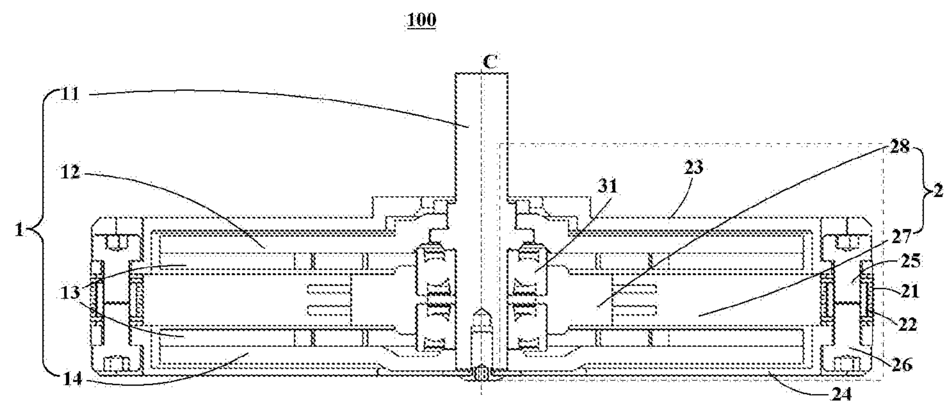
FIG. 1 is a schematic axial cross-sectional view of a motor having a stator element.

The foregoing and other features of the patent will become apparent from the following specification with reference to the accompanying drawings. Specific implementations of the patent are disclosed in the specification and the accompanying drawings, which illustrate some implementations in which the principles of the patent may be adopted. It should be understood that, the patent is not limited to the implementations described, and conversely, the patent includes all modifications, variations and equivalents that fall within the scope of the appended claims.

In the embodiments of this application, the terms “first”, “second”, and the like are used to distinguish different elements from the title, but do not indicate the spatial arrangement or chronological order of the elements, and the elements should not be limited by these terms. The term “and/or” includes one kind of or any one of a plurality of listed associated terms and a combination thereof. The terms “include”, “comprise”, “have”, and the like indicate the existence of the stated features, elements, components, or assemblies, but do not exclude the existence or addition of one or more other features, elements, components, or assemblies.

In the embodiments of this application, the singular form of “a”, “the”, and the like include the plural form, and should be broadly understood as “one kind” or “one category” rather than limited to “one”. In addition, the term “the” should be understood to include both the singular form and the plural form, unless the context clearly indicates otherwise. In addition, the term “according to” should be understood to mean “at least in part according to”, and the term “based on” should be understood to mean “at least in part based on”, unless the context clearly dictates otherwise.

Further, in the following description of the patent, for the ease of description, the direction in which the central axis of the rotor assembly extends is referred to as “axial direction”, and in the “axial direction”, the direction in which the second cover portion is directed to the first cover portion is the “up” direction, and the direction opposite to the “up” direction is the “down” direction; the radial direction centered on the central axis is referred to as “radial direction”; the direction around the central axis is referred to as “circumferential direction”; and “in the stack direction, the two components are aligned” means that “in the stack direction, the geometric centers of the two components are aligned so that the geometric centers of the two components are located in a straight line in the stack direction”.

An embodiment of this application provides a stator assembly that may be constructed as a part of a motor. In the following description of this embodiment, that the motor is an axial flux motor is used as an example. However, this embodiment is not limited thereto, that is, the technical idea of the stator element in this embodiment may also be applied to a stator element in a radial flux motor.

Figure 2:
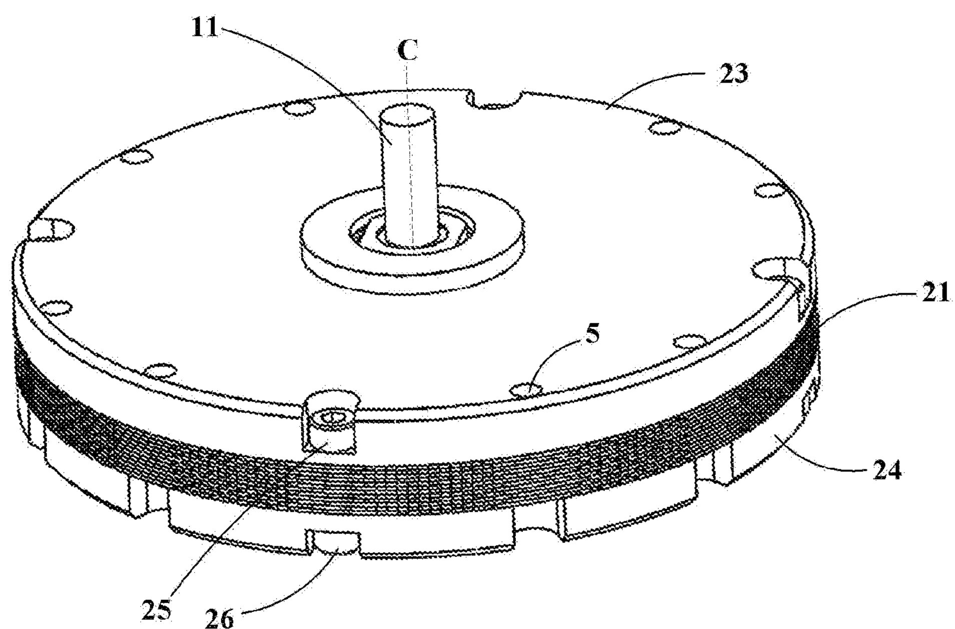
FIG. 2 is a schematic three-dimensional view of a motor.

FIG. 1 is a schematic axial cross-sectional view of a motor having a stator element, and FIG. 2 is a three-dimensional view of a motor.

As shown in FIG. 1, a motor 100 may include a rotor assembly 1 and a stator assembly 2.

The rotor assembly 1 includes at least one rotor 12 and 14 that can rotate around a central axis C. At least one magnet 13 is provided on the rotors 12 and 14 respectively. The rotor assembly 1 may further include a rotating shaft 11 that can rotate around the central axis C.

The stator assembly 2 includes at least one stator winding (that is, a coil) 27, at least one bearing mounting ring 28, and a stator element 21. The stator winding 27 and the bearing mounting ring 28 are located inside the stator element 21. The rotors 12 and 14 may be axially opposite to the stator winding 27 respectively.

In this embodiment, the at least one stator winding 27 and the at least one bearing mounting ring 28 may be a part of the stator.

The stator winding 27 may have a stator core 30 (not shown in FIG. 1) to increase a strength of a magnetic field generated by the stator winding 27. In addition, the stator core 30 is not essential, and the stator winding 27 may not have the stator core 30.

In this embodiment, the stator assembly 2 may further include a resin portion 29 (not shown in FIG. 1). The resin portion 29 has a specific mechanical strength, and may be used to fix the stator winding 27 and the bearing mounting ring 28 to an interior of the stator element 21. The resin portion 29 is made of, for example, epoxy resin. Therefore, heat generated by the stator winding 27 may be transferred to the stator element 21 through the resin portion 29, and is transferred to an external environment through the stator element 21.

As shown in FIG. 1, the motor 100 may further include at least one bearing 31. The bearing 31 is mounted on a radially inner side of the bearing mounting ring 28. The rotating shaft 11 is located on a radially inner side of the bearing 31, and therefore the rotating shaft 11 can rotate relative to the stator assembly 2 using the bearing 31.

As shown in FIG. 1 and FIG. 2, the motor 100 may further include a first cover 23 and a second cover 24. In a direction parallel to the central axis C, the first cover 23 and the second cover 24 respectively clamp the stator element 21 from both sides of the stator element 21.

In an implementation, the first cover 23 and the second cover 24 may be respectively fixed to the stator element 21 using a fastening member, which may be, for example, a bolt. For example, in FIG. 1 and FIG. 2, the first cover 23 and the second cover 24 may be respectively fixed to the stator element 21 using bolts 25 and 26. As shown in FIG. 1, an internal screw stud 22 may be disposed in the stator element 21. An upper side and a lower side of the internal screw stud 22 may be respectively fastened to the bolts 25 and 26, to fix the first cover 23, the second cover 24, and the stator element 21.

In addition, as shown in FIG. 2, the motor 100 may further include one or more bolt mounting holes 5. The bolt mounting hole 5 may penetrate through the first cover 23, the stator element 21, and the second cover 24. Therefore, a fixing bolt can pass through the bolt mounting hole 5, the first cover 23, the stator element 21, and the second cover 24 to be fixed to a specific apparatus, such as a machine station.

The stator element 21 in this embodiment is described below with reference to the accompanying drawings.

Figure 3:
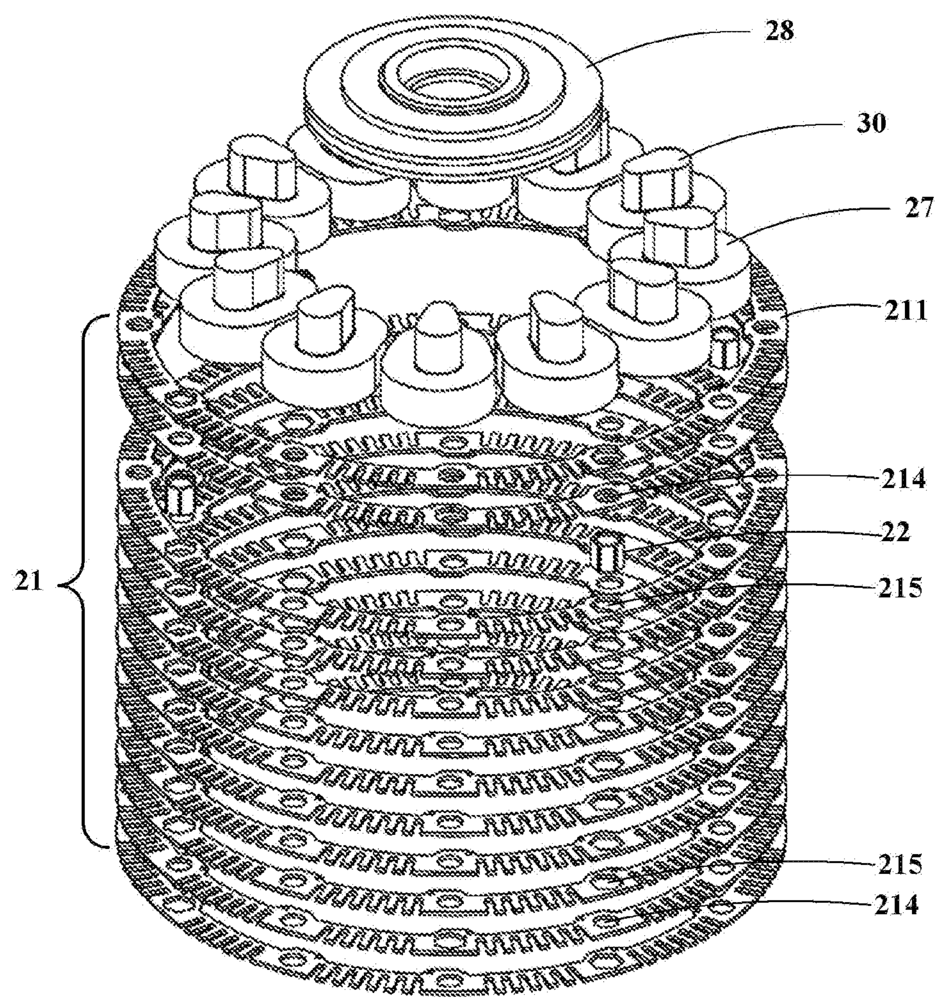
FIG. 3 is a schematic exploded view of the stator winding, a bearing mounting ring, a stator core, and a stator element in this embodiment.
Figure 4:
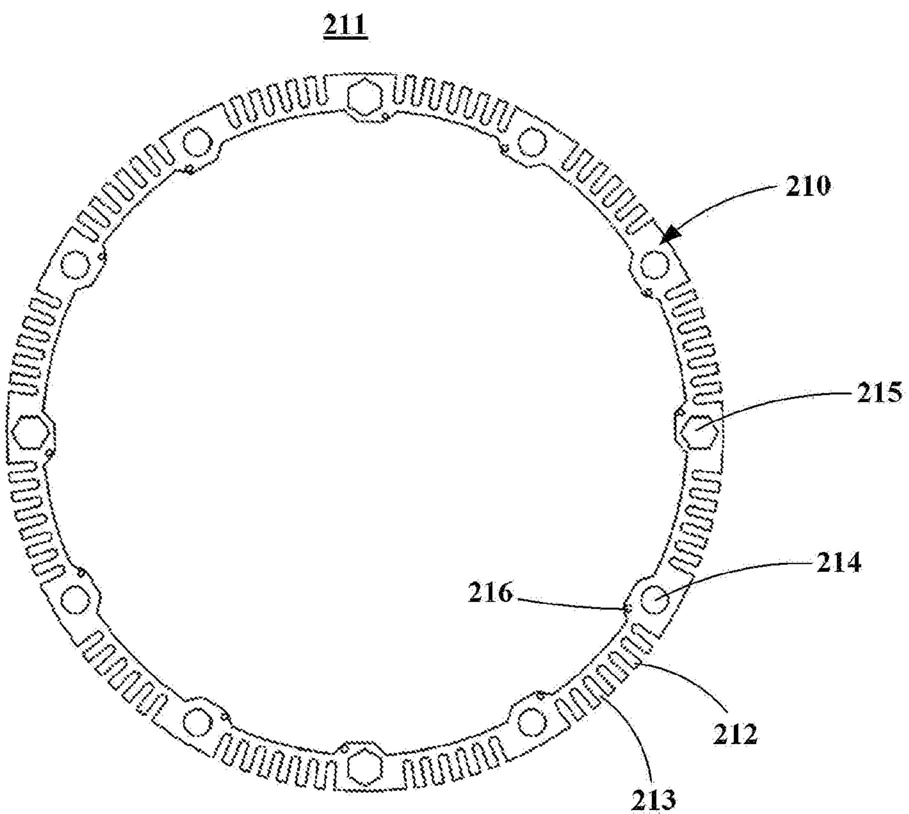
FIG. 4 is a top view of a stator housing sheet in this embodiment.
Figure 5:
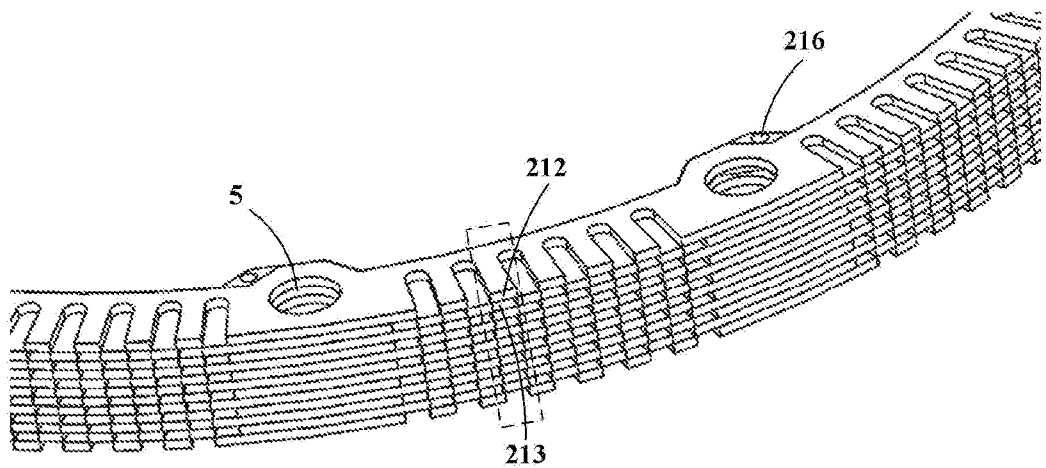
FIG. 5 is a three-dimensional view of a portion of a stator element viewed from an outside of the stator element in this embodiment.
Figure 6:
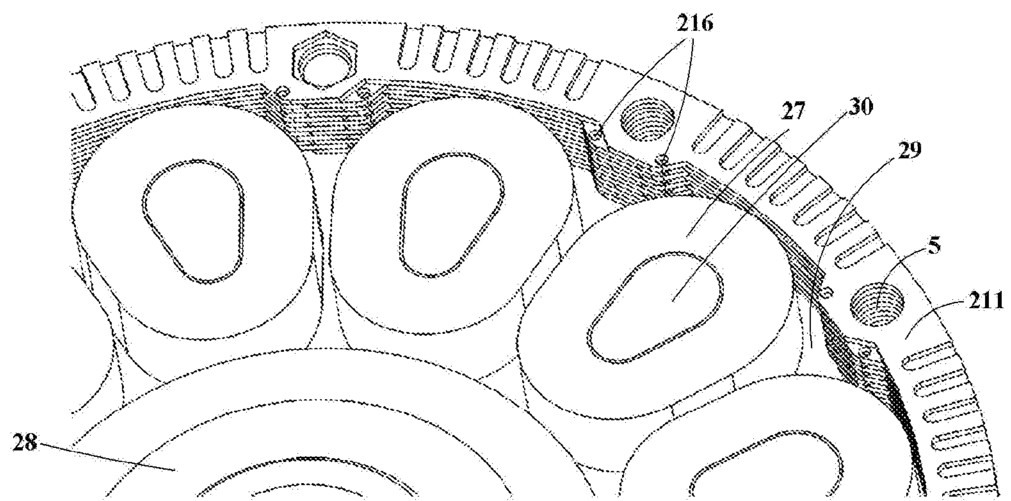
FIG. 6 is a three-dimensional view of a portion of a stator element viewed from an inside the stator element in this embodiment.
Figure 7:
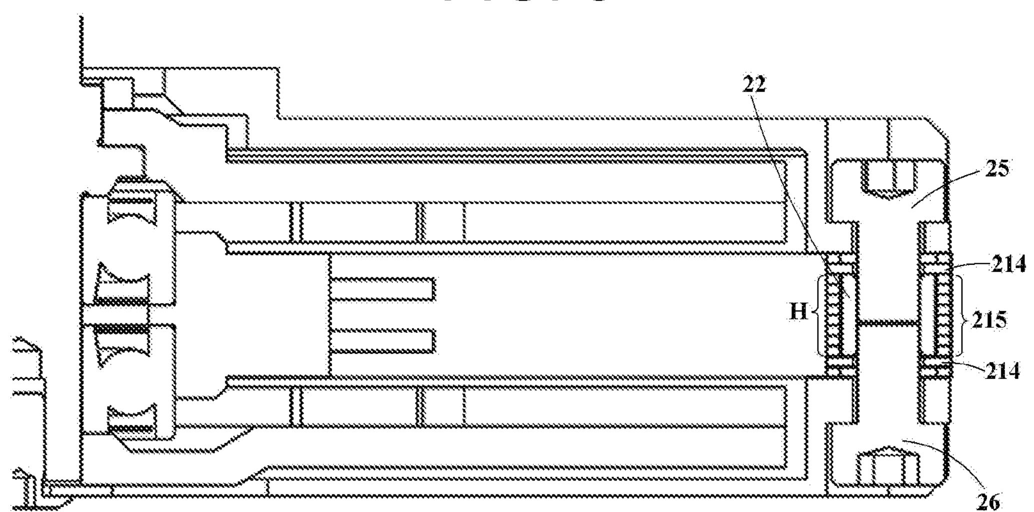
FIG. 7 is a schematic enlarged view of a dashed-line frame part in FIG. 1.

FIG. 3 is a schematic exploded view of the stator winding 27, a bearing mounting ring 28, a stator core 30, and a stator element 21 in this embodiment. FIG. 4 is a top view of a stator housing sheet in this embodiment. FIG. 5 is a three-dimensional view of a portion of a stator element viewed from an outside of the stator element in this embodiment. FIG. 6 is a three-dimensional view of a portion of a stator element viewed from an inside the stator element in this embodiment. FIG. 7 is a schematic enlarged view of a dashed-line frame part in FIG. 1.

As shown in FIG. 3 and FIG. 6, the stator element 21 may include at least two stacked stator housing sheets 211. A stack direction is, for example, a direction parallel to the central axis C. In addition, as shown in FIG. 3 and FIG. 6, the stator winding 27 and the stator core 30 are located inside the stator element 21, and a plurality of stator windings 27 and stator cores 30 are arranged around a periphery of the bearing mounting ring 28.

As shown in FIG. 4, each stator housing sheet 211 is a frame enclosed by a sheet body. At least two protrusions 212 are disposed around a periphery 210 of the stator housing sheet 211, the protrusion 212 being directed from an inside of the stator housing sheet 211 to an outside of the stator housing sheet 211. A groove 213 is formed between adjacent protrusions 212.

As shown in FIG. 5, in the stator element 21, protrusions 212 of the adjacent stator housing sheets 211 are alternately arranged in a stack direction of the at least two stator housing sheets 211. For example, the protrusions 212 may be alternately arranged such that at least a portion of the protrusion 212 at an upper layer is aligned with the groove 213 at a lower layer.

Therefore, the protrusion is not completely blocked by the stator housing sheet adjacent thereto in the stack direction, so that contact areas between an upper surface and a lower surface of the projection and air are increased, thereby enhancing a heat dissipation capability of the protrusion. For example, compared to a stator element without a protrusion in circumferential directions, the stator element in this embodiment can increase the heat dissipation capability by 0.5 times to two times.

In this embodiment, as shown in FIG. 3 and FIG. 4, at least one internal screw stud mounting groove 215 and at least one bolt hole 214 are further disposed around the periphery of each stator housing sheet 211.

In this embodiment, the internal screw stud mounting groove 215 is configured to mount the internal screw stud 22 (shown in FIG. 1), and a shape of an inner periphery of the internal screw stud mounting groove 215 is the same as that of an outer periphery of the internal screw stud 22. In an implementation, the shape of the inner periphery of the internal screw stud mounting groove 215 is a regular polygon, such as a regular hexagon; and a fixing bolt can pass through the bolt hole 214. Therefore, the bolt hole 214 may become a part that constitutes the bolt mounting hole 5 (shown in FIG. 2, FIG. 5, and FIG. 6). For example, in the stack direction of the at least two stator housing sheets 211, the bolt holes 214 of the stator housing sheets 211 are aligned to facilitate formation of the bolt mounting hole 5 to be passed through by a fixing bolt.

In this embodiment, a shape of an inner periphery of the bolt hole 214 may be a circle. In addition, the shape of the inner periphery of the bolt hole 214 may be other shapes that can be engaged with the fixing bolt.

In this embodiment, a diameter of the bolt hole 214 may be less than that of a circumcircle of the internal screw stud mounting groove 215, so that an axial position of the internal screw stud 22 (shown in FIG. 1) mounted in the internal screw stud mounting groove 215 can be limited. In this embodiment, the diameter of the bolt hole 214 may be greater than an inner diameter of the internal screw stud 22. Therefore, the bolt hole 214 does not impede mounting of the bolts 25 and 26 to the internal screw stud 22.

In this embodiment, as shown in FIG. 4, FIG. 5, and FIG. 6, one or more resin engaging trenches 216 are disposed on an inner edge of the periphery of each of the stator housing sheets 211. Flowing resin can flow into the resin trench 216. Therefore, after the flowing resin forms a resin portion 29 through solidification, the resin trench 216 can connect the resin portion 29 and the stator element 21 more firmly.

In this embodiment, as shown in FIG. 6, in the stack direction of the at least two stator housing sheets 211, the resin engaging trenches 216 of the adjacent stator housing sheets 211 may be alternately arranged, that is, at least two resin engaging trenches 216 are unaligned in the stack direction. Therefore, the resin portion 29 and the stator element 21 can be connected more firmly, and an interface used for transfer of heat from the resin portion 29 to the stator element 21 can be increased.

In this embodiment, as shown in FIG. 7 and FIG. 3, in the stack direction of the at least two stator housing sheets 211, within a height range H (shown in FIG. 7) of the internal screw stud 22, internal screw stud mounting grooves 215 of adjacent stator housing sheets 211 are aligned. Therefore, the internal screw stud 22 can be disposed in the stacked internal screw stud mounting grooves 215.

As shown in FIG. 7 and FIG. 3, in the stack direction of the at least two stator housing sheets 211, the bolt holes 214 of the stator housing sheets 211 on an upper side and a lower side of the height range H (FIG. 7) of the internal screw stud 22 are aligned with the internal screw stud mounting groove 215 of the stator housing sheet 211 within the height range H of the internal screw stud, that is, the bolt holes 214 of the stator housing sheets 211 are stacked on both axial sides of the internal screw stud 22 respectively. Therefore, the bolt holes 214 can restrict the axial displacement of the internal screw studs 22 on both axial sides.

In this embodiment, when the internal screw stud mounting grooves 215 are aligned in the stack direction, and/or the bolt holes 214 are aligned with the internal screw stud mounting grooves 215 in the stack direction, and/or the bolt holes 214 are aligned in the stack direction, the projections 212 of the adjacent stator housing sheets 211 need to be alternately arranged in the stack direction.

In an implementation, as shown in FIG. 3, shapes of the stator housing sheets 211 are the same, and the shape of the stator housing sheet 211 and a mirror shape thereof do not overlap. Within the height range H of the internal screw stud 22, one of the adjacent two stator housing sheets 211 may be turned by 180 degrees relative to the other of the stator housing sheets 211 (that is, upper and lower surfaces of the stator housing sheet 211 that are perpendicular to an axial direction are turned upside down), and the turned stator housing sheet 211 is stacked with the adjacent stator housing sheet 211. Therefore, when the internal screw stud mounting grooves 215 are aligned with each other, the protrusions 212 are alternatively arranged.

In this embodiment, the shape of the stator housing sheet 211 and the mirror shape thereof do not overlap. The internal screw stud mounting grooves 215 and the bolt holes 214 of the stator housing sheet 211 may be evenly distributed on the outer periphery, and the protrusions 212 are unevenly distributed on the outer periphery. Uneven distribution of the protrusions 212 on the outer periphery may be, for example, uneven widths of the protrusions 212 and/or the grooves 213 in circumferential directions.

In addition, this embodiment may be not limited thereto. For example, shapes of the adjacent stator housing sheets in stack direction may be different, and positions of the internal screw stud mounting groove 215 and the bolt hole 214 are set to be the same, and widths of the protrusions 212 and/or the grooves 213 of in the circumferential directions are different. Therefore, the protrusions 212 can be alternately arranged when the internal screw stud mounting grooves 215 are aligned with each other.

In this embodiment, the stator housing sheet 211 may be formed through impact molding, laser cutting, or wire cutting. Therefore, manufacturing and processing costs of the stator element 21 can be greatly reduced.

In this embodiment, since the stator element 21 is formed by at least two stacked stator housing sheets 211, an axial dimension of the stator element 21 can be flexibly set through adjustment of a number of stacked stator housing sheets 211. For example, when an axial dimension of the stator assembly of the motor is changed to change a power and/or a torque characteristic of the motor, the number of stator housing sheets 211 may be adaptively changed.

In this embodiment, the protrusion is not completely blocked by the stator housing sheet adjacent thereto in the stack direction, so that contact areas between an upper surface and a lower surface of the projection and air are increased, thereby enhancing a heat dissipation capability of the stator element at relatively low costs. In addition, since the stator element is located at an outer periphery of the stator winding, a magnetic circuit of the motor is not affected. Moreover, the resin portion and the stator element are more firmly connected using the disposed resin groove.

Embodiment 2 of the patent provides an electromechanical device, including the motor according to Embodiment 1. Since the structure of the motor has been described in detail in Embodiment 1, the content thereof is incorporated herein, and the descriptions are omitted herein.

In this embodiment, a protrusion of a stator element of the motor is not completely blocked by a stator housing sheet adjacent thereto in a stack direction, so that contact areas between an upper surface and a lower surface of the projection and air are increased, thereby enhancing a heat dissipation capability of the stator element. Therefore, a heat dissipation capability of the motor and reliability of the electromechanical device are enhanced.

The patent has been described above in combination with the detailed description. However, those skilled in the art should understand that these descriptions are illustrative and are not intended to limit the protection scope of the patent. Those skilled in the art can make modifications and changes to the patent according to the spirit and principle of the patent. These modifications and changes shall fall within the scope of the patent.

What is claimed is:

1. A stator element, comprising at least two stator housing sheets that are arranged in a stack manner, each of the stator housing sheets being a frame enclosed by a periphery formed in a sheet shape, at least two protrusions being disposed around the periphery of each of the stator housing sheets, the protrusion being directed from an inside of the stator housing sheet to an outside of the stator housing sheet, a groove being formed between the adjacent protrusions, wherein the protrusions of the adjacent stator housing sheets are alternately arranged in a stack direction of the at least two stator housing sheets, and one or more resin engaging trenches are disposed on an inner edge of the periphery of each of the stator housing sheets, and in the stack direction of the at least two stator housing sheets, the resin engaging trenches of the adjacent stator housing sheets are alternately arranged.

2. The stator element according to claim 1, wherein at least one internal screw stud mounting groove and at least one bolt hole are further disposed on the periphery of each of the stator housing sheets, wherein the internal screw stud mounting groove is to mount an internal screw stud, and a shape of an inner periphery of the internal screw stud mounting groove is the same as a shape of an outer periphery of the internal screw stud.

3. The stator element according to claim 2, wherein a diameter of the bolt hole is less than a diameter of a circumcircle of the internal screw stud mounting groove and greater than an inner diameter of the internal screw stud.

4. The stator element according to claim 2, wherein in the stack direction of the at least two stator housing sheets and within a height range of the internal screw stud, the internal screw stud mounting grooves of the adjacent stator housing sheets are aligned.

5. The stator element according to claim 4, wherein in the stack direction of the at least two stator housing sheets, the bolt holes of the stator housing sheets on an upper side and a lower side in the height range of the internal screw stud are aligned with the internal screw stud mounting groove of the stator housing sheet within the height range of the internal screw stud.

6. The stator element according to claim 4, wherein within the height range of the internal screw stud, shapes of the stator housing sheets are the same, and the shape of the stator housing sheet and mirror shapes thereof do not overlap, and in the two adjacent stator housing sheets, one of the stator housing sheets is turned 180 degrees relative to the other of the stator housing sheets.

7. The stator element according to claim 1, wherein the stator housing sheet is formed through impact molding, laser cutting, or wire cutting.

8. A stator assembly, comprising a stator and the stator element according to claim 1, the stator being located inside the stator element.

9. The stator assembly according to claim 8, wherein the stator comprises a coil; and the stator assembly further comprises resin that is used to fix the coil to an interior of the stator element.

10. A motor, comprising a rotor that rotates around a central axis and the stator assembly according to claim 9.

11. An electromechanical device, comprising the motor according to claim 10.

12. A motor, comprising a rotor that rotates around a central axis and the stator assembly according to claim 8.

13. The motor according to claim 12, wherein the motor further comprises a first cover and a second cover, and in a direction parallel to the central axis, the first cover and the second cover respectively clamp the stator element from both axial sides of the stator element.

14. An electromechanical device, comprising the motor according to claim 12.

15. The motor according to claim 12, wherein the rotor and the stator assembly are oppositely disposed in a direction parallel to the central axis.

16. An electromechanical device, comprising the motor according to claim 15.

* * * * *